United States Patent [19]
McMillin et al.

[11] Patent Number: 5,184,003
[45] Date of Patent: Feb. 2, 1993

[54] SCANNABLE FORM HAVING A CONTROL MARK COLUMN WITH ENCODED DATA MARKS

[75] Inventors: John V. McMillin, Iowa City; Jay V. Clark, West Liberty, both of Iowa

[73] Assignee: National Computer Systems, Inc., Eden Prairie, Minn.

[21] Appl. No.: 826,264

[22] Filed: Jan. 24, 1992

Related U.S. Application Data

[63] Continuation of Ser. No. 444,869, Dec. 4, 1989, abandoned.

[51] Int. Cl.⁵ .......................... G06K 7/14; G09B 7/00
[52] U.S. Cl. ...................... 235/454; 235/494; 434/363
[58] Field of Search .............. 234/437, 438, 454, 456, 234/494; 434/363; 283/37

[56] References Cited

U.S. PATENT DOCUMENTS

| | | | |
|---|---|---|---|
| 2,952,998 | 9/1960 | Mitchell et al. | |
| 3,453,419 | 7/1969 | Torrey | 235/494 |
| 3,458,688 | 7/1969 | Garry et al. | |
| 3,643,348 | 2/1972 | Azure, Jr. | 434/353 |
| 3,715,568 | 2/1973 | Azure, Jr. | 340/149 |
| 3,728,677 | 4/1973 | Munson | 235/494 |
| 3,793,472 | 2/1974 | Sternberg et al. | 434/363 |
| 3,831,009 | 8/1974 | McMillin | 250/555 |
| 3,886,326 | 5/1975 | Horvath et al. | |
| 3,900,961 | 8/1975 | Sokolski et al. | |
| 4,117,975 | 10/1978 | Gunn | 235/494 |
| 4,172,554 | 10/1979 | Clarnival et al. | 235/494 |
| 4,213,040 | 7/1980 | Goken et al. | 235/476 |
| 4,300,791 | 11/1981 | Bohrer et al. | 283/38 |
| 4,478,584 | 10/1984 | Kaney | 434/353 |
| 4,782,221 | 11/1988 | Bråss et al. | 235/487 |
| 4,787,075 | 11/1988 | Matsuoka et al. | 235/454 |

*Primary Examiner*—Vincent P. McGraw
*Attorney, Agent, or Firm*—Dorsey & Whitney

[57] ABSTRACT

A scannable form for use in an optical mark reading system has a timing track that is pre-encoded with data information known or determined prior to a respondent completing the scannable form. The data information is pre-encoded in the control mark column on the scannable form by utilizing that portion of the control mark column that is not essential for conveying the scan control information associated with the scan control marks. The data information is encoded using data marks that represent the data information in a binary or other similar coding technique. The data marks are column-aligned with the scan control marks in the control mark column.

22 Claims, 5 Drawing Sheets

Fig. 1

1. Sex
   ○ Male
   ○ Female

2. Age

3. Grade
   ○ 3
   ○ 4
   ○ 5
   ○ 6
   ○ 7
   ○ 8
   ○ 9

SCANNABLE FORM HAVING A CONTROL MARK COLUMN WITH ENCODED DATA MARKS

This is a continuation of application Ser. No. 07/444,869, filed Dec. 4, 1989, now abandoned.

TECHNICAL FIELD

The present invention relates generally to the field of optical mark scanning apparatus and to the scannable forms for use with such apparatus. More particularly, the present invention relates to a scannable form having at least one control mark column with encoded data marks column-aligned in the same column with the scan control marks that comprise the timing track for the scannable form.

BACKGROUND ART

Optical mark scanning apparatus (often referred to as optical mark reading or OMR systems) and the scannable forms for such systems are well known in the prior art. There are a wide variety of applications that use OMR systems and scannable forms in the large-scale gathering of information (e.g., standardized tests, census information, preference surveys, etc.). The scannable forms for use in such systems are sheets of paper or other similar material that typically have a timing track comprised of plurality of pre-printed scan control marks (sometimes referred to as timing marks) in a control mark column and a plurality of response areas consisting generally of a row of response bubbles located on the sheet in a specified relationship with the scan control marks. The scan control marks are used to trigger the OMR system to scan or "read" the response areas associated with that scan control mark to detect whether a data mark is present at a particular response bubble. Scan control marks may also be used to indicate the beginning or end of the scanning operation for a scannable form.

Most OMR systems utilize a scannable form with a single timing track comprising a control mark column of identically spaced, uniform scan control marks (e.g., U.S. Pat. No. 3,831,009). Other prior art OMR systems use either one or two timing tracks comprising a control mark column having mostly uniform scan control marks with a first and/or last scan control mark of a different size or shape to indicate control functions other than scan or read, such as start scanning a form or stop scanning a form (e.g., U.S. Pat. Nos. 3,793,472 and 3,900,961). Still other prior art systems use more than one type of scan control mark to signal the scan or read (e.g., U.S. Pat. No. 3,886,326).

The ability to encode data information on the scannable form has long been recognized as desirable. For purposes of the present invention, data information is defined as information that is known or determined prior to the respondent completing the scannable form (e.g., school, class, grade, correct answer, etc.). For example, U.S. Pat. No. 3,643,348 describes a scannable form having the test answers encoded in a set of columns adjacent the control mark column so that the forms may be scored without the need of a separate answer key. Other forms have utilized separate pre-printed or pre-encoded response areas to designate data information on the scannable form before the respondent completes the form. One example of this approach is the use of bar codes or bar code stickers affixed to the form to convey the data information.

Unfortunately, such prior art schemes utilize valuable space on the scannable form and may be aesthetically undesirable in certain applications or require additional circuitry to decode the data information. The traditional method of using a data mark positioned in one response bubble among a group of response bubbles is an inefficient means for encoding data information that is known prior to the respondent completing the form. For example, a typical name field on a scannable form to be completed by a respondent might use a plurality of columns of letters to represent the letters of the respondent's name, each column having 26 response bubbles corresponding to the 26 letters of the alphabet. Obviously, this method of encoding data information wastes space on the scannable form and requires additional processing in order to decode the information into a form usable by a data processing system. On the other hand, while the bar code method minimzes the space on the scannable form necessary to encode the data information, it requires the use of additional hardware circuitry in order to properly decode the data information encoded in the bar codes.

Although the existing scannable forms may be satisfactory for situations where no data information is to be pre-encoded on the scannable form or where only a relatively small amount of data information is to be pre-encoded, they are not well-suited for pre-encoding significant amounts of data information on a scannable form. Accordingly, there is a continuing need for improvements in scannable forms for OMR systems to allow for the pre-encoding of data information in a manner that maximizes the amount of data information that may be encoded in a minimum amount of space on the scannable form without interfering with other areas on the scannable form. Such a scannable form should provide for an efficient coding and retrieval of the pre-encoded data information, yet be both cost-effective and consistent with current OMR systems standards.

SUMMARY OF THE INVENTION

In accordance with the present invention, a scannable form for use in an OMR system is provided in which the timing track is pre-encoded with data information by using a control mark column having encoded data marks that are column-aligned with the scan control marks. The data information is pre-encoded in the control mark column by utilizing that portion of the control mark column that is not essential for conveying the control information associated with the scan control marks. In addition, the data information is encoded using data marks that represent the data information in a binary or other similar coding technique that may be quickly and efficiently decoded using current data processing systems. The ability to variably encode data information relating to the manufacturing or printing conditions under which the scannable form was created and to merge data information from existing student data files is of particular interest.

In one embodiment of the present invention, the area between successive scan control marks is pre-encoded with one or more black/white binary data marks that allow the timing track of the scannable form to convey the pre-encoded data information. In another embodiment of the present invention, the data marks are printed in varying color ranges such that they may be scanned without affecting the scanning of the black scan control marks. In still another embodiment of the present invention, the data marks are organized according to horizontal and vertical segments of the area in the control mark column between successive scan control marks. This embodiment provides the capability to encode significant amounts of data information, including self-detection and self-correction codes that will allow the data information to be scanned and decoded correctly, even though paper flaws or extraneous marks may interfere with the scanning of the data marks.

Accordingly, an objective of the present invention is to provide a scannable form for use in an OMR system that allows for the pre-encoding of data information in the control mark column.

A further objective of the present invention is to provide a scannable form for use in an OMR system that allows for the pre-encoding of data information in a manner that maximizes the amount of data information that may be encoded in a minimum amount of space on the scannable form without interfering with other areas on the scannable form.

Another objective of the present invention is to provide an efficient system for coding and retrieval of pre-encoded data information on a scannable form for use in an OMR system that is both cost-effective and consistent with current OMR system standards, such as forms created on a high quality, high speed laser printing system for variably encoding the data information.

A still further objective of the present invention is to provide a scannable form for use in an OMR system that allows for the pre-encoding of data information in a manner that is aesthetically pleasing to the respondent and does not interfere with the overall design of the scannable form.

Still another objective of the present invention is to encode data information on a scannable form such that it is not apparent to the respondent, thereby allowing for increased security of the data information.

These and other objectives of the present invention will become apparent with reference to the drawings, the detailed description of the preferred embodiment and the appended claims.

DESCRIPTION OF THE PREFERRED EMBODIMENTS

The present invention maximizes the amount of data information that may be encoded in a minimum amount of space on a scannable form without interfering with other areas on the scannable form by pre-encoding the data information as a plurality of data marks that are column-aligned with the scan control marks that comprise the control mark column of the scannable form. By pre-encoding the data information as data marks in the control mark column in acordance with the present invention, the scannable form is both cost-effective and consistent with current OMR standards. A scannable form utilizing the present invention may be scanned or "read" by any current OMR system using any number of mark scanning techniques that are well known in the prior art (e.g., conductive scanning, reflective scanning, Trans-Optic ® scanning). As described in more detail hereinafter, in a preferred embodiment the data marks do not interfere with the existing control scan marks because the data marks are located in that portion of the control mark column that is not necessary for detecting the scan control marks. Although not all OMR systems would be able to detect and/or decode the pre-encoded data information present on a scannable form in accordance with the present invention, the existence of the data information on the scannable form will not disrupt the normal scanning of the form in an OMR system that is not capable of decoding the data information. This transparency of operation allows the present invention to be adapted for use within the standards for current OMR systems.

Figure 1:
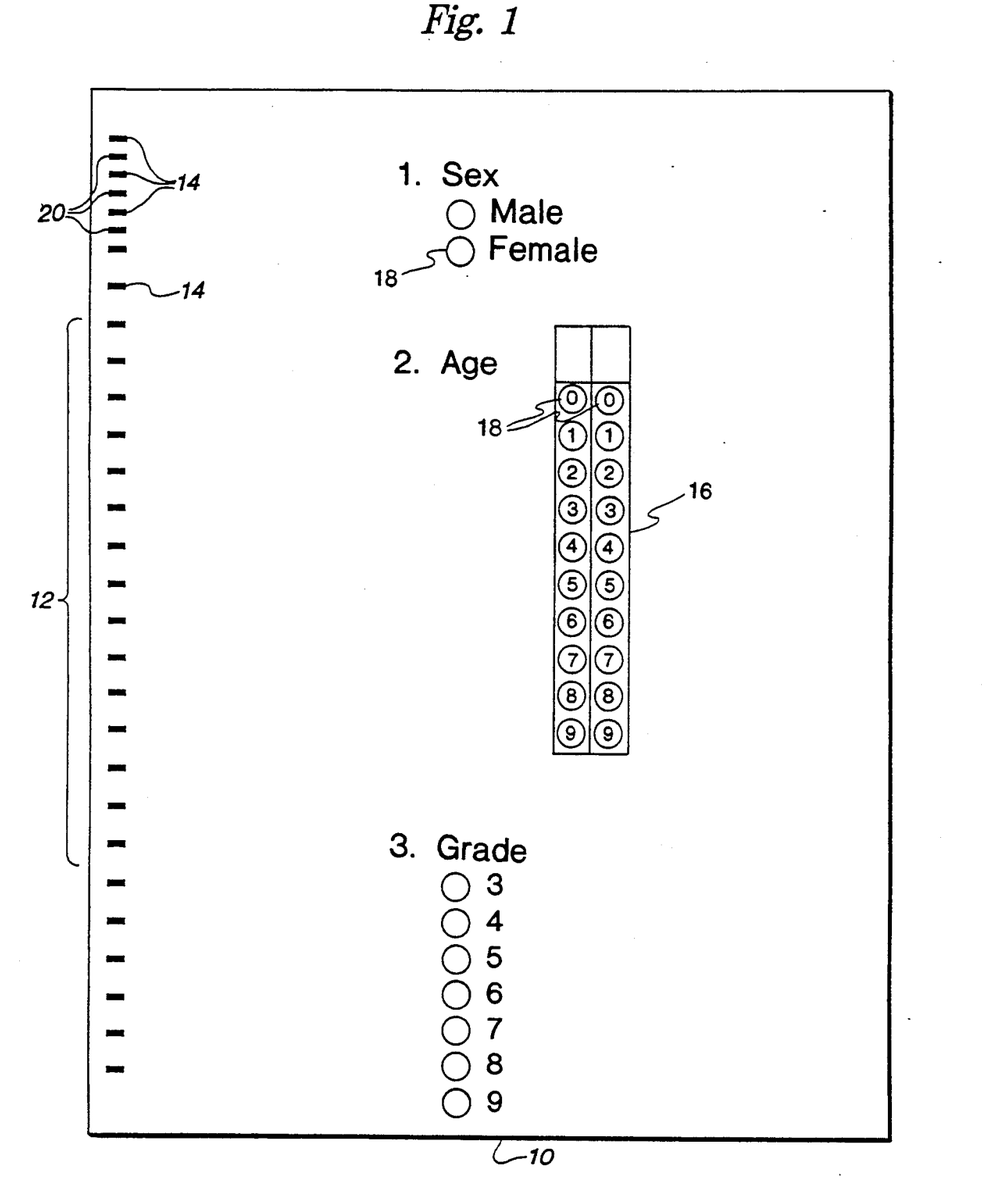
FIG. 1 is a depiction of a scannable form in accordance with the present invention utilizing full-width data marks in a single control mark column to convey data information.

Referring now to FIG. 1, a preferred embodiment of a scannable form 10 in accordance with the present invention will be described. The scannable form 10 is a generally rectangular sheet of paper or other similar material. In this embodiment, the scannable form 10 is 8½" by 11" printed on Mark Reflex ® paper stock suitable for scanning by an OpScan ® 2100 OMR scanner, available from National Computer Systems, Inc. Minneapolis, Minn. For purposes of clarity in understanding the preferred embodiment, the term "column" will refer to the longer "length" orientation of the scannable form 10 and the term "row" will refer to the shorter "width" orientation of the scannable form 10. It will be recognized that in general operation, the scannable form 10 is inserted lengthwise into an OMR scanner system (not shown) and scanning occurs from left to right on a row-by-row basis as the form 10 passes under a scan or read head. It should be also be apparent that these conventions are not meant to limit the scope of the invention.

The scannable form 10 has pre-printed along the left edge of the form 10 a control mark column 12 comprising a plurality of scan control marks 14. For at least one of the scan control marks, a response area 16 comprising a plurality of response bubbles 18 are pre-printed in the row associated with the particular scan control mark 14. In this embodiment, the data information is conveyed using a plurality of full-width data marks 20 that are column-aligned with the scan control marks 14 in the control mark column 12. The presence of a data mark 20 would indicate a binary "1" and the absence of a data mark would indicate a binary "0". Starting with the first data mark 20 in the upper left-hand portion of the scannable form 10 as the lowest order bit and finishing with the last date mark 20 in the bottom left-hand corner as the highest order bit, the entire set of data marks 20 in this embodiment are used to generate a single Sheet Identification Code that comprises a 31 bit binary number capable of representing more than 1 billion unique Sheet Identification Codes. For the scannable form 10 shown in FIG. 1, the data marks 20 indicate a unique Sheet Identification Code having the value "7" as represented by the three least significant "bits" or data marks 20 being turned on for this scannable form.

The scan control marks 14 are pre-printed in an alternating pattern with the data marks 20 in a 6 TPI (tracks per inch) format. Standard OMR systems are set up to detect scan control marks 14 in the 6 TPI format; however, in this embodiment, only every other mark detected by the OMR system is a scan control mark 14. The remaining marks detected by the OMR system are data marks 20. By using the full-width data marks 20 in the manner shown in this embodiment, it would not be possible to scan for information in a response bubble 18 in any of the rows associated with the data marks 20 without modifying the control mechanism of the OMR scanner. It should be noted that the control mechanism for the OMR scanner could be modified to generate two scan pulses for each scan control mark 14 detected, one scan pulse at detection of the scan control mark 14 and one halfway between the scan control mark just read and the next expected scan control mark.

The printing techniques that would allow for the pre-encoding of the data marks 20 during the creation of the scannable form 10 are well known. In traditional plate printing press technology, a film containing the data information as data marks 20 to be pre-encoded on the scannable forms 10 is used to generate the printing plate that is used to repetitively create the scannable forms. For variable encoding of the data information, laser printing technology operating under computer control may be used. In particular, high speed, high quality laser printers may be used to variably encode data marks 20 conveying either manufacturing/environmental data information about the conditions under which the scannable form 10 was created (i.e., paper stock, humidity, form number), or student data information from a pre-existing computer file supplied, for example, by the school district requesting the forms.

Figures 2, 3:
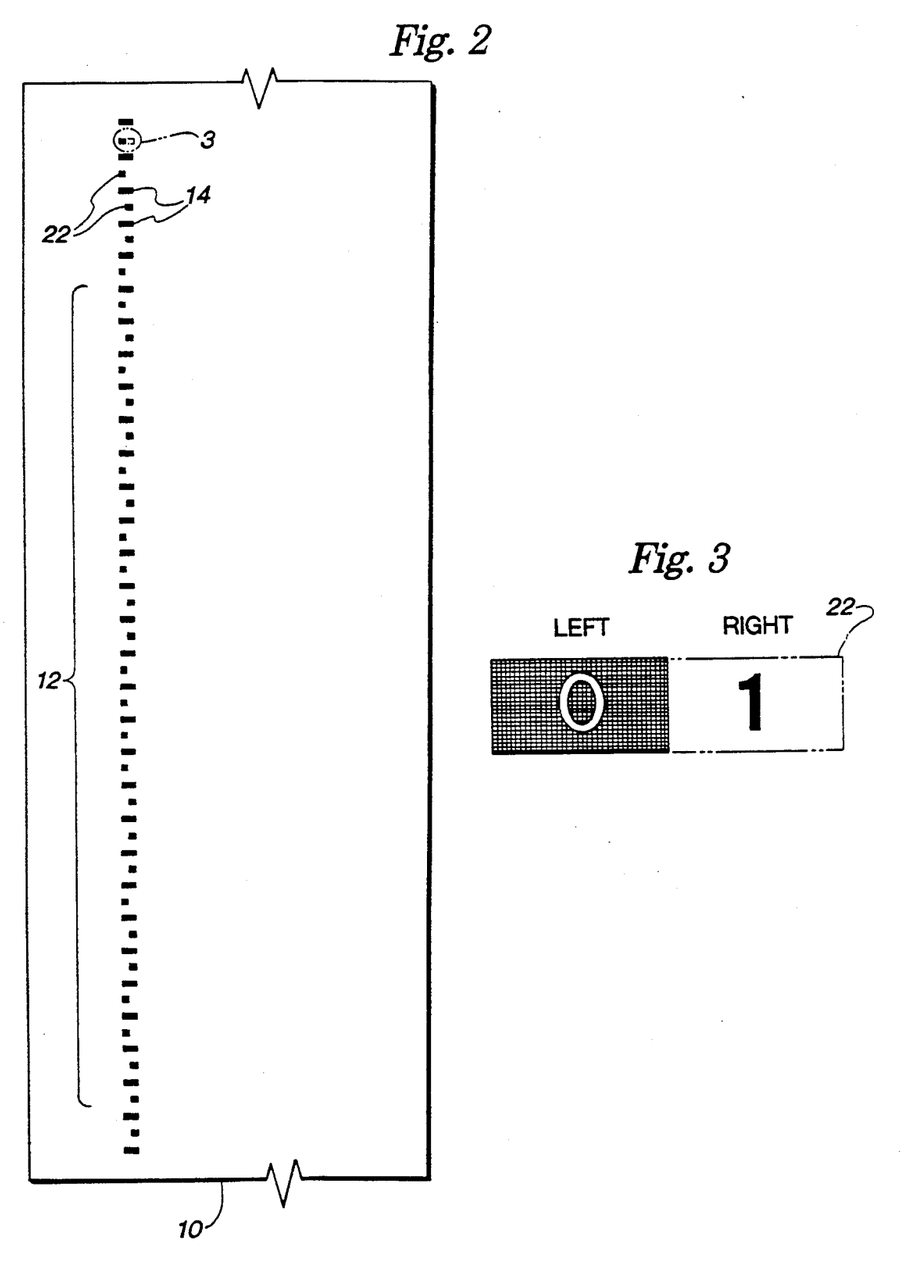
FIG. 2 is a depiction of another scannable form in accordance with the present invention utilizing half-width data marks in two control mark columns to convey data information.
FIG. 3 is an enlarged view of the half-width data mark of the scannable form shown in FIG. 2.

Referring now to FIG. 2, another embodiment of the present invention is shown. Only the control mark column is shown in FIG. 2, although it will be recognized that various types of response areas 16 and response bubbles 18 may be provided for in this embodiment. In this embodiment, the data information is encoded using a half-width data mark 22 as shown in greater detail in FIG. 3. As with the embodiment shown in FIG. 1, this embodiment is capable of representing a 31 bit binary digit, or any combination of values represented by binary digits totalling 31 bits, for encoding the desired data information. In this embodiment, if the left half of the data mark 22 is black or "on" and the right half of the data mark 22 is white or "off", the bit represents a binary "0", as shown in FIG. 3. Conversely, if the right half of the data mark 22 is black and the left half of the data mark 22 is white, the bit represents a binary "1". The advantage of this embodiment is that the data marks 22 may also be used by the OMR system as triggers to generate a scan pulse for reading a row of response bubbles associated with that mark because either the left or right half of the data mark 22 will always be "on" to the OMR scanner. Thus, it is possible to scan all of the rows in a standard 6TPI format scannable form.

Figure 4:
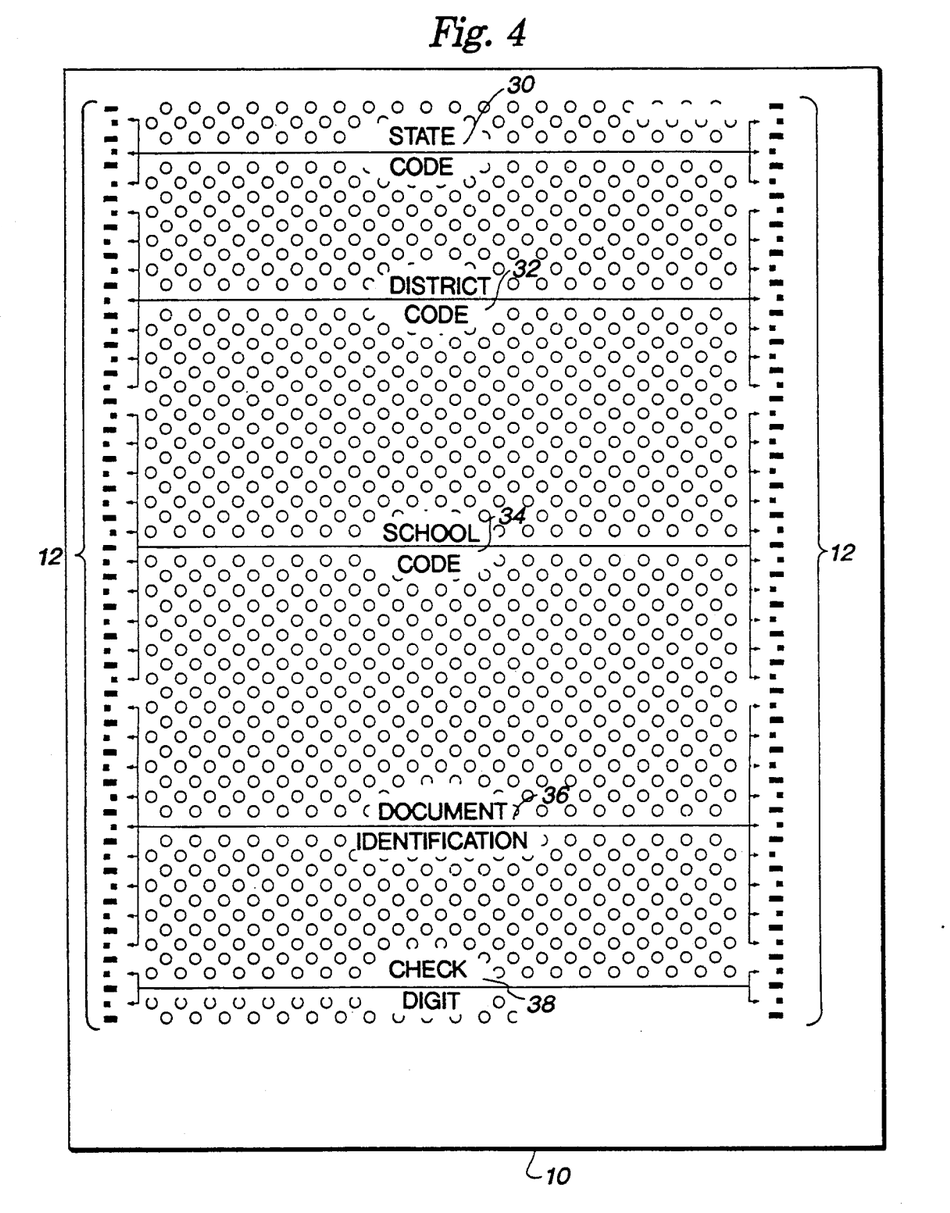
FIG. 4 is a depiction of the scannable form in accordance with the half-width data marks shown in FIG. 2 detailing the various types of data information that may be represented.
Figure 5:
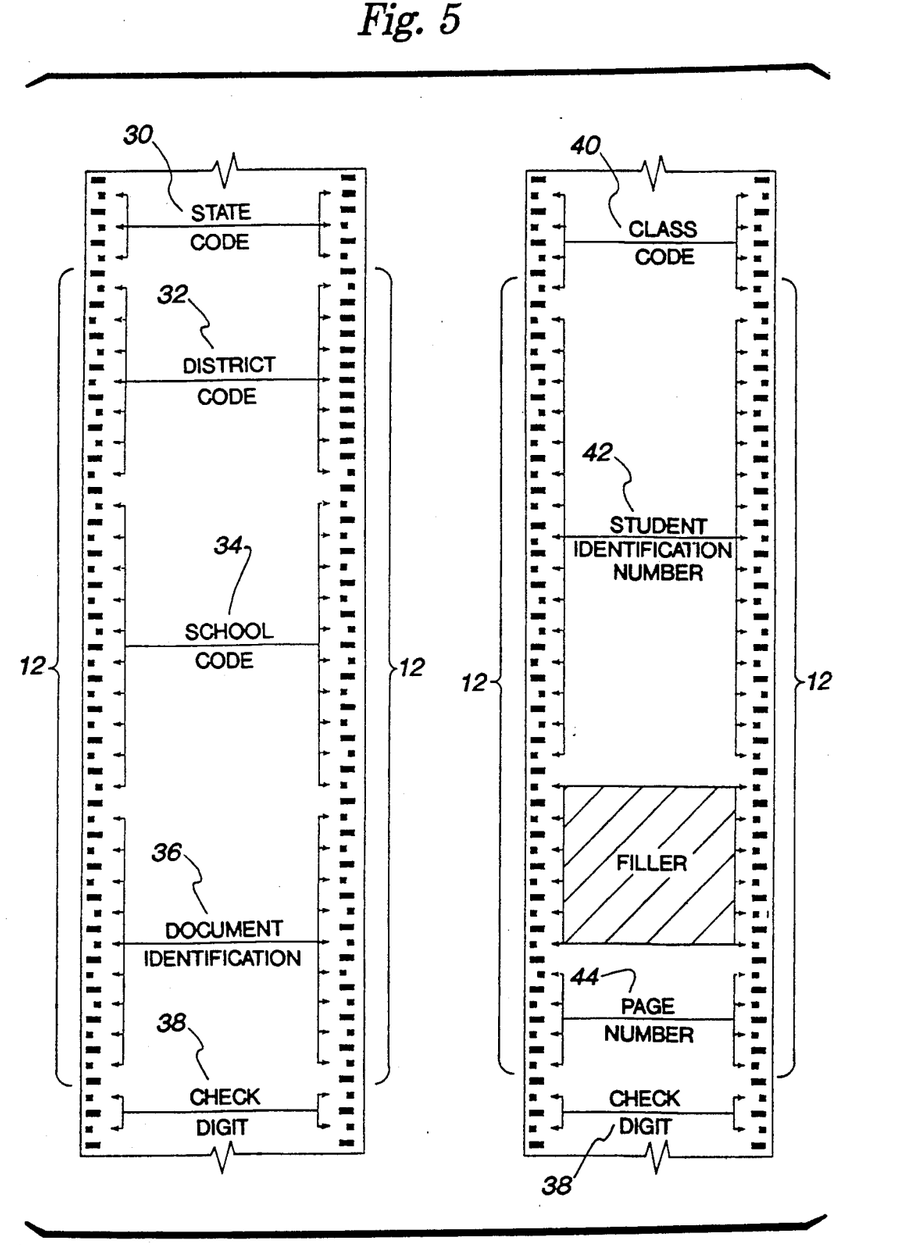
FIG. 5 is a partial depiction of two sides of a scannable form similar to FIG. 4 utilizing both sides of the scannable form to convey data information.

As shown in FIG. 4, utilizing two control mark columns 12, and FIG. 5 utilizing four control mark columns 12, two on each side of the scannable form 10, it is possible for a significant amount of data information of a wide variety to be pre-encoded on the scannable form 10. For example, in the embodiment shown in FIG. 4, a school district may provide the supplier of the scannable forms 10 with a magnetic tape or disk in a machine-readable format containing the data information desired to be pre-encoded on the scannable forms 10 for use in the administration of a battery of standardized tests. The data information might include a 6 bit State Code 30, a 14 bit District Code 32, a 20 bit School Code 34, an 18 bit Document Identification 36, and a 4 bit Check Digit. In printing the requested scannable forms 10, the supplier would encode this data information using the data marks 22 as shown in FIG. 4. Because all of the scannable forms 10 for a particular school will contain the same pattern of data marks 22, it is possible to print such forms using either traditional plate printing press technology or current laser printing technology.

With the data information pre-encoded on the scannable forms 10 as shown in FIG. 5, each scannable form 10 may be linked or matched to other data information contained in a user-provided data base so that information collected from the response areas 16 on the scannable form 10 could be matched with the additional data information in the data base. For example, student information such as class, name, address, age, sex, etc. could be supplied to the scorer of the scannable form 10 in a machine-readable format so that the reports generated upon scanning and scoring the scannable forms 10 would include the student information in printed form, without the need for this information to be entered by the student in completing the form. In the embodiment shown in FIG. 5, the data information in the user-provided data base is matched to the particular form by the encoding of an 8 bit Class Code 40 and a 30 bit Student Identification Number 42 on the scannable form 10. When the scannable form 10 is scanned after being completed by the student respondent, a computer system can match the Student Identification Number 42 to the associated information in the user-provided data base, thereby eliminating the need to encode all of the particulars of the data information for a particular student on the scannable form.

Not only does the use of the pre-encoded data information save time in filling out the scannable form 10, it also saves space by decreasing, or eliminating, the number of data information response areas 16 needed to gather data information known prior to the administration of the scannable form. In addition, the accuracy of the data information, is increased because the possibility of coding errors by the respondent is eliminated. For example, the data information could be encoded on the scannable form 10 in the control mark column 12 and the student's name or identification number could be printed in a human readable format elsewhere on the scannable form 10 for purposes of assisting the teacher or test administrator in matching the scannable form 10 with the proper respondent. Experience has shown that such a capability would be especially helpful in administering tests to young children (i.e. grades K-3) because the children are generally unable to fill in the requested demographic information on a scannable form and, thus, with existing scannable forms, the teacher must fill in this information for each student's form.

In the embodiment shown in FIG. 5, the scannable forms 10 might also include encoded data marks 22 associated with an 8 bit Page Number 44 if the scannable form 10 is to be part of a test booklet, and one or more Check Digits 38 to ensure the accuracy and correctness of the pre-encoded data information. The Document Identification Code 36 could be used by the supplier to indicate printing information such as batch number, paper stock number, ink lot, etc., so that printing errors could be more easily identified and traced. The Check Digit in this embodiment is a Modulo 11 check digit. It should be recognized that any number of standard check digit or error correction codes or techniques code could be used and pre-encoded on the scannable form 10 to insure that none of the data information is altered or destroyed.

It will be appreciated that once the concepts and techniques embodied in the present invention are known, any number of applications involving the pre-encoding of data information on a scannable form can be envisioned. Moreover, the particular method or marks used to encode or convey the data information in the control mark column should not be limited to the alternating binary techniques already discussed. The present invention provides a means for encoding data information on a scannable form that can convey a vast amount of data information in a limited amount of space. In theory, using only the control mark column and scanning techniques using discrimination levels that are currently available, it is possible to encode more data information than could conceivably be used in a test environment.

Figure 6:
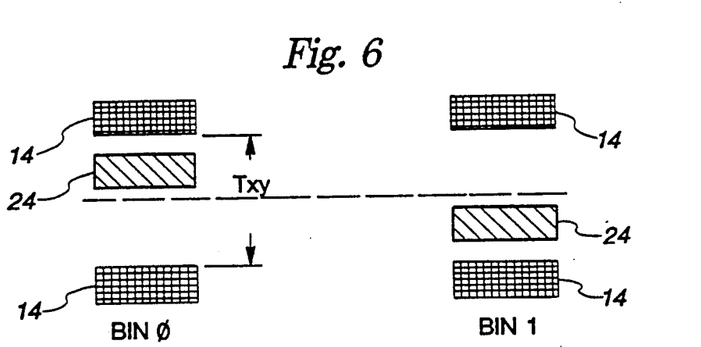
FIG. 6 is an enlarged view of an alternate embodiment showing a data mark that uses a vertical binary coding scheme.
Figure 7:
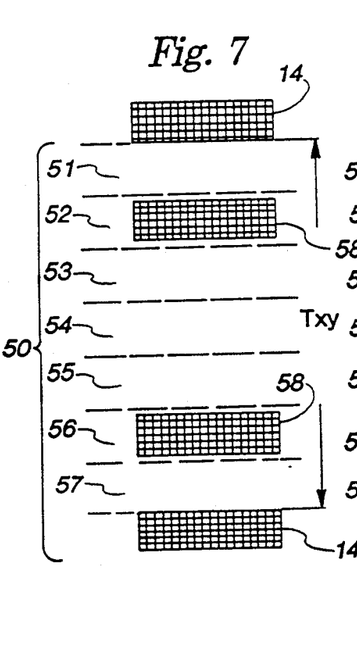
FIG. 7 is an enlarged view of an alternate embodiment showing a data mark that uses a vertical 2 of 5 coding scheme.
Figure 8:
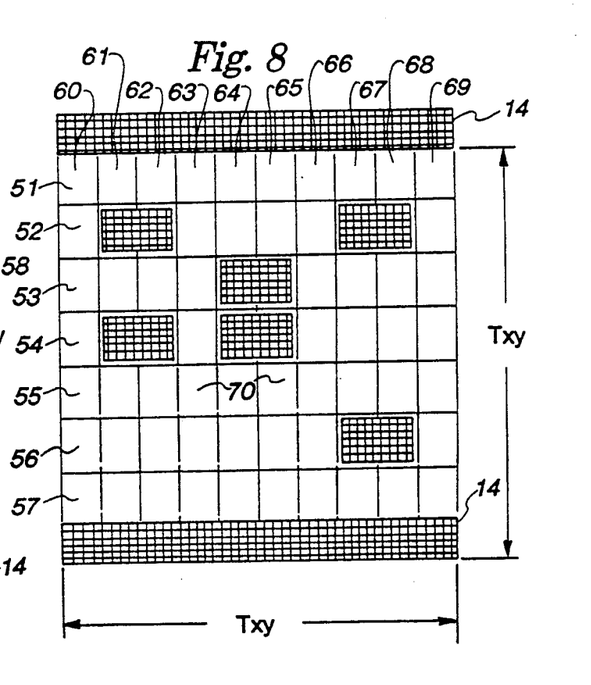
FIG. 8 is an enlarged view of an alternate embodiment showing a data mark that uses a combined horizontal and vertical coding scheme.

Referring now to FIGS. 6-8, the various approaches to increasing the amount of data information that may be encoded using the present invention are discussed. A fundamental limit on the amount of data information that may be encoded on a scannable form is a function of the amount of space on the form that is available to convey such information, i.e. the information spectrum of the scannable form. For scannable forms, other fundamental limits include the medium being printed on, the medium used to print, the area or optical spectrum, or both, in which the OMR scanner system is operating, and the detection level or resolution of the OMR scanner system. To maintain compatibility with current OMR standards, the data information must be encoded in that portion of the information spectrum of the scannable form that is common to all scannable forms and is accessible to the OMR system (i.e., the edge/thickness of the sheet is unused but is not accessible to be scanned by conventional OMR systems). Presently, almost all of the space on a scannable form compatible with current OMR systems is used, either as part of the response areas 16 or the control mark column 12, or is reserved for particular uses such as print-after-scan strip, lead-edge/trail edge or other clear zones, slit bands, skunk codes or preprinted reference bars, etc. Because all of the usable space is presently assigned on standard scannable forms, the present invention seeks to encode data information by utilizing the unused portion of the bandwidth of the information spectrum associated with the control mark column. In other words, the present invention recognizes and makes use of the fact that not all of the space in current control mark columns is necessary to convey the scan control information and that additional data information can be encoded into this same space without affecting the original scan control information.

It is a maxim of information theory that a given bandwidth (frequency, space, sound, bit, DNA, etc.) can carry only a certain maximum amount of information. Obviously, the more space that is available, the more data information that can be encoded. The present invention may be used with any number of control mark columns, depending upon how many control mark columns per side of a scannable form are present, how many sides of the form are used, and how many forms are used together, e.g. how many forms comprise a test booklet. For purposes of understanding the theoretical limits on the amount of data information that may be conveyed by the present invention, it is convenient to express the information content of the given system as a "signal-to-noise" (S/N) ratio represented in terms of decibels (dB). The S/N ratio provides an ability to determine the proportionate amount of information that can be conveyed for a given system, without needing to know how many scan control marks or control mark columns will be used in a given application. The S/N ratio can be expressed as:

$$S/N = 20 \log_{10}(V_2/V_1)$$

In an audio context, $V_2$ is the output voltage signal and $V_1$ is the input voltage signal. Note that if $V_2 = V_1$ (output voltage equals input voltage), then $S/N = 20 \log_{10}(1) = 0$ dB. Thus, 0 dB represents the situation where there is no information content in the output beyond the input. In a digital context, the information content is expressed in terms of bits of information, rather than voltage levels. For example, for a standard compact disc the analog-to-digital quantizing represents the output voltage and is set at $2^{16}$ bits $= 65,536$ (analog converted levels) and the input voltage may be represented as $-/+1$ bit as the threshold quantizing "noise" level. Thus, the theoretical S/N ratio for a compact disc is:

$$\begin{aligned} S/N &= 20 \log_{10}(2^{16}/1) \\ &= 96.33 \text{ dB} \end{aligned}$$

Applying these principles of information theory and S/N ratio to understanding the representation of data information in the control mark column as set forth in the present invention, it is possible to define the amount of information that may be represented in the space between two consecutive scan control marks ($T_{xy}$). Presently, the space ($T_{xy}$) between one scan control mark ($T_n$) and the next scan control mark ($T_{n+1}$) merely maintains the scan control information, but contains no additional information. Thus, the S/N ratio digital information present in the timing tracks of current OMR systems can be defined as:

$$\begin{aligned} S/N &= 20 \log_{10}((\text{bits in } T_{n+1} - T_n)/1) \\ &= 20 \log_{10}(1/1) \\ &= 0 \text{ dB} \end{aligned}$$

Accepting that the S/N ratio for the digital information present in the timing track of current OMR systems is 0 dB, the present invention seeks to utilize the untapped bandwidth in the control mark column in the form of the space ($T_{xy}$) between one scan control mark and the next scan control mark, as well as in the form of the color spectral and print contrast scales of the data mark printed in the space ($T_{xy}$). In general, there are four parameters available in the space ($T_{xy}$) that can be used to increase the information content of the space and convey encoded data information: (1) the vertical y-space between consecutive scan control marks; (2) the horizontal x-space associated with the width of a scan control mark; (3) the color spectrum that may be detected by different sensors; and (4) the print density that may be detected by different sensors. As discussed hereinafter, any combination of one or more of the above parameters may be used to increase the information content of the space ($T_{xy}$) to convey the encoded data information.

Referring now to FIG. 6, a single y-space encoding system in accordance with the present invention is shown. For 6 TPI forms, the vertical height of each scan control mark 14 is 0.030" and the vertical height of the space ($T_{xy}$) is 0.167". For 8 TPI forms, the vertical height of the scan control marks is also 0.030", but the vertical height of the space ($T_{xy}$) is 0.125". In this embodiment, the data marks 24 are comprised of binary coded marks that are placed either in the upper half (binary "0") or the lower half (binary "1") of the y-space between two consecutive scan control marks. The S/N ratio for this encoding system is:

$$S/N = 20 \log_{10}((2 \text{ states per } T_n - T_{n+1})/1)$$
$$= 6.02 \text{ dB}$$

Referring now to FIG. 7, a multiple y-space encoding system in accordance with the present invention is shown. In this embodiment, the vertical distance between consecutive scan control marks 14 is divided into 7 equal data mark zones 50. For 6 TPI forms, the height for each data mark zone is 0.0167"(0.117"/7). For 8 TPI forms, the height for each data mark zone is 0.0136"(0.095"/7). The vertical printing press Y-axis two-tower tolerance for printing data marks in the data marks zones 50 is on the order of 0.0136" +/−(0.005" to 0.007"). It should be noted that these dimensions are well within current scanner technology capabilities and nearly twice the minimum world-wide bar code line width specifications. In this embodiment, the data mark zones 50 are used as follows: zones 51 and 57 adjacent to the scan control marks 14 are assigned as guard bands and will not contain any data marks; and zones 52, 53, 54, 55, and 56 hold the data marks 58 that convey the data information. In this version, zones 52 thru 56 represent the well-known 2 out of 5 ten-state decimal coding scheme with even parity check. The S/N ratio for this encoding system is 20 dB. In another version, zone 52 is assigned as a parity bit and zones 53, 54, 55, and 56 make up a 4-bit hexadecimal nibble. The S/N ratio for this version is 24.08 db. With these types of S/N ratios, it is possible to represent up to 32 decimal digits in a single control mark column for a 6 TPI form.

Referring now to FIG. 8, the x-axis, horizontal dimension is added to the previous encoding system shown in FIG. 7. In this embodiment, the horizontal width of the space ($T_{xy}$) (0.150") is divided into 10 horizontal zones 60 through 69, each horizontal zone having a width of 0.0167". Reserving the guard band zones associated with vertical data zones 51 and 57, the combined vertical and horizontal division of the space ($T_{xy}$) would produce forty-five (45) pixel-point data zones 70. A variety of encoding schemes can be employed to utilize the pixel-point data zones 70. In one version, the outermost horizontal zones 60 and 69, as well as the outer most vertical zones 51 and 57 are used as guard bands. As a result, three sets of a 2 of 5 code are used to encode up to 3 decimal digits per space ($T_{xy}$), the first digit in horizontal zones 61 and 62, the second digit in horizontal zones 64 and 65, and the third digit in horizontal zones 67 and 68. The S/N ratio for this version is 60 dB. By altering the encoding schemes used with this embodiment, the amount of data information that may be encoded is extremely large, depending upon the degree of error tolerance in the encoding scheme and the adjustment/selection of the other limits such as type of paper stock, ink, printing press, and the OMR scanner system employed to scan the form. Even the use of error correcting codes, in addition to error detecting codes, would not significantly diminish the information capacity of this embodiment. In the most extended version of this embodiment, each vertical data zone 52 thru 56 would represent an 8-bit byte with a parity bit. The S/N ratio for this version would be greater than 150 dB.

It should be noted that each of the systems discussed above in connection with FIGS. 6–8 would require the use of additional hardware or software in the OMR system to capture and decode the encoded data information. If the scan control mark, rather than the space ($T_{xy}$), is used to convey both scan control information and data information, the scannable forms in accordance with the present invention may be compatible with and could be scanned by some of the current OMR systems, even though such systems may not be equipped to capture and decode the data information encoded using the data marks in the control mark column.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A scannable form for use in an optical mark reading system with optical sensing means of the type wherein sensing the presence or absence of response marks placed by a respondent in predetermined response areas on the form is triggered by sensing of a sequence of scan control marks associated with the predetermined response areas, comprising:

a generally rectangular sheet of material;

at least one column of control marks located on said sheet and oriented substantially parallel with an edge of said rectangular sheet comprising a plurality of spaced scan control marks defining data mark areas located between adjacent scan control marks nd aligned within the column of control marks;

at least one response area on said sheet associated with one of said scan control marks comprising a plurality of response bubbles in a specified rotation with said scan control mark; and a plurality of data marks located on said sheet in said data mark areas aligned within the control mark column, said data marks comprising optically scannable marks that represent encoded data information that is known or determined prior to a respondent completing said scannable form by marking one or more of said response bubbles, such that said data marks will be scanned and decoded by the optical mark reading system during the scanning of said control mark column.

2. The scannable form of claim 1 wherein said data marks are comprised of a series of binary-coded marks located between successive pairs of said scan control marks.

3. The scannable form of claim 2 wherein said binary coded mark is comprised of a mark occupying subtantially the full-width of said control mark column such that the absence of a mark represents a binary "0" and the presence fo a mark represents a binary "1".

4. The scannable form of claim 2 wherein said binary coded mark is comprised of two adjacent half-width data marks, each half-width data mark occupying one-half of the width of said control mark column such that the absence of a mark in the left half-width data mark and presence of a mark in the right half-width data mark represents a binary "0" and the presence of a mark in the left half-width data mark and absence of a mark in the right half-width data mark represents a binary "1".

5. The scannable form of claim 1 wherein there are two of said control mark columns located on opposite edges from one another on the same side of said sheet of material.

6. The scannable form of claim 5 wherein said binary coded mark is comprised of a mark occupying substantially the full-width of said control mark column such that the absence of a mark represents a binary "0" and the presence of a mark represents a binary "1".

7. The scannable from of claim 5 wherein said binary coded mark is comprised of two adjacent half-width data marks, each half-width data mark occupying one-half of the width of said control mark column such that the absence of a mark in the left half-width data mark and presence of a mark in the right half-width data mark represents a binary "0" and the presence of a mark in the left half-width data mark and absence of a mark in the right half-width data mark represents a binary "1".

8. The scannable form of claim 1 wherein there are four of said control mark columns, two control mark columns located on opposite edges from one another on a first side of sheet of material and the remaining two control mark columns located on opposite edges from one another on a second side of sheet of material.

9. The scannable form of claim 1 wherein said data information includes manufacturing information relating to the creation of said scannable form.

10. The scannable form of claim 1 wherein said data information includes respondent information relating to information or data about a particular one of said respondents.

11. The scannable form of claim 1 wherein said data information includes error-correction/error-detection information for said data marks.

12. The scannable form of claim 1 wherein each of said data marks are located in a space $T_{xy}$ between successive pairs of said scan control marks.

13. The scannable form of claim 12 wherein said space $T_{xy}$ is divided into a plurality of horizontal divisions.

14. The scannable form of claim 13 wherein said data information is encoded as binary marks in said horizontal divisions.

15. The scannable form of claim 13 wherein said data information is encoded as a 2 of 5 ten-state mark in said horizontal divisions.

16. The scannable form of claim 12 wherein said space $T_{xy}$ is divided into a plurality of horizontal and vertical divisions creating a plurality of pixel points.

17. The scannable form of claim 13 wherein said data information is encoded as binary marks in said pixel points.

18. The scannable form of claim 13 wherein said data information is encoded as a 2 of 5 ten-state marks in said pixel points.

19. A scannable form for use in an optical mark-reading system with optical sensing means of the type wherein sensing the presence or absence of response marks placed by a person in predetermined response areas on the form is triggered by sensing of a sequence of scan control marks associated with the predetermined response areas, comprising:
    a) a sheet;
    b) a plurality of blank response bubbles on the sheet, able to be marked by a person;
    c) a column of spaced control marks on the sheet defining data mark areas that are located between adjacent control marks and aligned within the column of control marks, said control marks being used for triggering the optical sensing means in the optical mark-reading system to read the response bubbles; and
    d) data marks located on the sheet in said data marks areas aligned within the column of control marks, each data mark comprising one or more scannable marks that represent encoded data information that is known or determined prior to the person marking one or more of the response bubbles such that the data marks will be scanned and decoded by the optical mark reading system.

20. A scannable form for use in an optical mark-reading system with optical scanning means of the type wherein sensing the presence or absence of response marks placed by a person in predetermined response areas on the form is triggered by sensing of a sequence of scan control marks associated with the predetermined response areas, comprising:
    a) a sheet;
    b) a plurality of rows of blank response bubbles on the sheet, able to be marked by a person;
    c) a column of spaced control marks on the sheet, including control marks each of which is
        i) associated with a unique one of the rows of response bubbles, and
        ii) able to activate the optical scanning means in the optical mark-reading system which reads the associated row of response bubbles; and
    d) data marks located on the sheet in data mark areas defined by the spaces the exist between adjacent control marks within the column of control marks, each data mark comprising one or more optically scannable marks that represent data encoded information that is known or determined prior to the person marking one or more of the response bubbles such that the data marks will be scanned and decoded by the optical mark reading system during the scanning of the column of control marks.

21. A method for providing data marks representing encoded data on a scannable form for receiving response marks, said encoded data being known or determined prior to the form receiving response marks and said data marks and the response marks to be sensed by optical scanning means past which the form is transported, said scanning means being of the type wherein sensing the presence or absence of response marks placed by a respondent in predetermined response areas on the form is triggered by sensing of a sequence of scan control marks associated with the predetermined response areas, comprising:

providing a generally rectangular sheet of material;

providing on said sheet of material at least one response area in which response marks may be received;

providing on said sheet a column of control marks in specified relation to the at least one response area, at least a portion of said control marks for generating response mark scan signals causing the optical scanning means to scan the sheet of material for possible response marks in the at least one response area, said column of control marks having within it inter-mark intervals between individual control marks; and providing on said sheet a plurality of data marks located in the inter-mark intervals and aligned within the column of control marks, said data marks representing encoded data sensed in the same optical scan as the control marks whereby said data marks provide signals representing predetermined data in addition to the response mark scan signals supplied by the control marks.

22. An optical mark reading system of the type wherein the presence or absence of response marks placed by a respondent in predetermined response areas on a scannable from in sensed in response to sensing of a sequence of scan control marks on said form associated with the predetermined response areas, comprising:

scanning means for optically scanning to sense the presence or absence of marks; and a generally rectangualr sheet of material for scanning by said scanning means comprising;

at least one column of control marks located on said sheet and oriented substantially parallel with an edge of said rectangular sheet comprising a plurality of spaced scan control marks defining data mark areas located between adjacent scan control marks and aligned within the column of control marks;

at least one response area on said sheet associated with one of said scan control marks comprising a plurality of response bubbles in a specified relation with said scan control mark; and a plurality of data marks located on said sheet in said data mark areas aligned within the control mark column, said data marks comprising optically scannable marks that represent encoded data information that is known or determined prior to a respondent completing said scannable form by marking one or more of said response bubbles, such that said data marks will be scanned and decoded by the optical mark reading system during the scanning of said control mark column.

* * * * *